United States Patent
Vastveit

(10) Patent No.: US 7,318,557 B2
(45) Date of Patent: Jan. 15, 2008

(54) ROTARY DISTRIBUTOR, METHODS FOR ITS USE AND THE USE OF THE DISTRIBUTOR

(75) Inventor: Kjell Vastveit, Finnoy (NO)

(73) Assignee: Agromiljo AS (NO)

( * ) Notice: Subject to any disclaimer, the term of this patent is extended or adjusted under 35 U.S.C. 154(b) by 274 days.

(21) Appl. No.: 10/511,879

(22) PCT Filed: Apr. 14, 2003

(86) PCT No.: PCT/NO03/00122

§ 371 (c)(1),
(2), (4) Date: Apr. 7, 2005

(87) PCT Pub. No.: WO03/088735

PCT Pub. Date: Oct. 30, 2003

(65) Prior Publication Data

US 2005/0167525 A1    Aug. 4, 2005

(30) Foreign Application Priority Data

Apr. 19, 2002   (NO)  .................................. 20021854

(51) Int. Cl.
  *A01C 17/00*   (2006.01)
  *A01C 19/00*   (2006.01)
  *B05B 3/06*    (2006.01)
(52) U.S. Cl. ....................... 239/667; 239/251; 239/662; 239/650; 239/663

(58) Field of Classification Search ................ 239/667, 239/681, 682, 261, 225.1, 549, 556, 650, 239/662, 664, 663, 689, 251; 141/99–100; 111/100, 130–133, 200, 118, 127, 925
See application file for complete search history.

(56) References Cited

U.S. PATENT DOCUMENTS 1,348,885 A * 8/1920 Laffoon ...................... 222/330

(Continued)

FOREIGN PATENT DOCUMENTS

DE        3417372 A * 11/1985

(Continued)

*Primary Examiner*—Kevin Shaver
*Assistant Examiner*—James S. Hogan
(74) *Attorney, Agent, or Firm*—Andrus, Sceales, Starke & Sawall, LLP

(57) ABSTRACT

A rotary distributor is for use in spreading solid particles and/or liquid from an agricultural machine. The rotary distributor comprises a round distributor having outlet holes arranged peripherally in the horizontal bottom of the housing and connected to outlet pipes 3, a first supply pipe 4 arranged centrally in the bottom of the distributor housing 1 for the supply of liquid under pressure and connected to a vertical, rotatably supported hollow rotor shaft 5 in flow communication with a first transverse hollow rotor arm 6 which has at least one angled, and downward-directed nozzle 7 that is level with the outlet holes 2. The distributor housing further comprises a means 10, 11 for introducing and distributing solid particles such as seed corn.

15 Claims, 3 Drawing Sheets

U.S. PATENT DOCUMENTS

| | | | |
|---|---|---|---|
| 1,443,342 A * | 1/1923 | Cabrini | 111/79 |
| 2,601,534 A * | 6/1952 | Laffoon | 222/330 |
| 4,480,794 A * | 11/1984 | Fuss et al. | 239/654 |
| 4,489,892 A * | 12/1984 | Tyler | 239/650 |
| 4,913,244 A * | 4/1990 | Trujillo | 175/65 |
| 5,271,567 A * | 12/1993 | Bauer | 239/662 |
| 5,272,992 A * | 12/1993 | Barbour et al. | 111/120 |
| 5,462,232 A * | 10/1995 | Vastveit | 239/662 |
| 6,510,805 B2 * | 1/2003 | Fima et al. | 111/100 |
| 6,851,450 B2 * | 2/2005 | Nimberger | 137/561 A |
| 6,997,400 B1 * | 2/2006 | Hanna et al. | 239/383 |

FOREIGN PATENT DOCUMENTS

| | | |
|---|---|---|
| DE | 3703743 A1 | 8/1987 |
| DE | 4136162 | 9/1992 |
| EP | 1044592 A1 * | 10/2000 |
| EP | 1702503 A1 * | 9/2006 |
| FR | 1573370 A | 7/1969 |
| GB | 1045732 A | 10/1966 |
| NO | 172521 B | 4/1993 |
| NO | 306091 B1 | 9/1999 |

* cited by examiner

ROTARY DISTRIBUTOR, METHODS FOR ITS USE AND THE USE OF THE DISTRIBUTOR

CROSS REFERENCE TO RELATED APPLICATION

The present application is the U.S. national stage application of International Application PCT/NO03/00122, filed Apr. 14, 2003, which international application was published on Oct. 30, 2003 as International Publication WO 03/088735. The International Application claims priority of Norwegian Patent Application 20021854, filed Apr. 19, 2002.

BACKGROUND OF THE INVENTION

The present invention relates to a rotary distributor for introducing solids such as seed corn into a liquid or gas stream consisting of, for example, liquid farmyard manure, water or air. The invention also relates to a method for wet sowing, a distribution method and the use of the rotary distributor.

Rotary distributors for spreading liquid farmyard manure and similar liquids or suspension are already known. Such apparatus are described in, e.g., DE 3703743, DE 4136162 and NO 172521. The apparatus described consist of a circular distributor housing having a plurality of apertures arranged in a ring on the underside thereof. Arranged inside the distributor housing is a rotating pipe, the discharge opening of which, during use, moves across the apertures. The inlet opening of the pipe is connected to the hollow shaft of the housing for liquid communication. Thus, liquid is passed into the bottom, up through the shaft, out through the pipe and is spread out across the apertures. From the apertures, the liquid is passed out onto the field through hoses and optionally other equipment.

The known apparatus are used for the uniform distribution of liquid farmyard manure on the field. Sowing is done before or after the fertilising in a separate work process. An integration of these two separate work processes into one operation would be time-saving and cost-effective and would also provide environmental benefits.

Norwegian Patent 306091 describes a method for wet sowing, where the sowing is carried out by injecting a jet of liquid mixed with seed corn into a growth medium, or by subsequently introducing seed corn into the groove formed by the jet. This document does not describe an apparatus for performing the method.

SUMMARY OF THE INVENTION

The object of the present invention is to provide a device for the simultaneous distribution of liquid fertiliser and seed corn or the like for use in a combined fertilising and sowing process.

The subject of the present invention is a rotary distributor for use in spreading solid particles and/or liquid, comprising a round distributor housing having outlet holes arranged peripherally in the horizontal bottom of the housing and connected to outlet pipes, a first supply pipe arranged centrally in the bottom of the distributor housing for the supply of liquid under pressure and connected to a vertical, rotatably supported hollow rotor shaft in flow communication with a first transverse hollow rotor arm which has at least one angled, downward-directed nozzle that is level with the outlet holes, characterised in that the distributor housing comprises a second supply pipe arranged centrally in the top of the distributor housing for the supply of solid particles and/or liquid and connected to the vertical rotatably supported hollow rotor shaft in flow communication with a second transverse hollow rotor arm which has at least one downward-directed opening that is level with the outlet holes, and that the rotor shaft comprises a dividing wall between the two rotor arms which ensures two separate streams.

Furthermore, the invention comprises a method for wet sowing, characterised in that in a rotary distributor according to the invention liquid is supplied under pressure to a first supply pipe, seed corn is fed to a second supply pipe and the stream of liquid and seed corn is discharged through the outlet pipes onto a field, whereby the liquid flowing out through the nozzle sets the rotor shaft in motion and thus causes seed corn and liquid to be distributed evenly across the outlet holes.

The invention also comprises a method for distributing solid particles, characterised in that the solid particles are fed with a gas stream to the second supply pipe in a distributor according to the invention and the rotor shaft is rotated mechanically, whereby the rotation and the gas stream cause the solid particles to be distributed evenly across the outlet holes and flow out through the outlet pipes.

In addition, the invention comprises the use of the rotary distributor according to the invention for wet or dry sowing.

Other features of the invention are set forth in the dependent claims.

The term "liquid" in the present application is used to mean water, an aqueous solution, liquid fertiliser, especially farmyard manure, a suspension, an emulsion or other substantially liquid substances which may contain solids.

The solid particles that can be distributed by the rotary distributor according to the invention comprise for example, seed corn, seeds, solid fertilisers, lime and other solid soil additives.

The gas stream is according to the invention preferably an air stream.

The distributor according to the invention can be used to provide a homogenous mixture of solid particles and a liquid whilst obtaining a uniform distribution of the mixture on the field.

One advantage of the rotary distributor according to the invention is that sowing and fertilising can be carried out simultaneously. Thus, seeds are fed to the second supply pipe whilst liquid farmyard manure is supplied under pressure to the first supply pipe. When the liquid fertiliser flows out through the nozzle, the rotor shaft is set in motion. Thus, seeds and fertiliser are distributed evenly to the outlet holes. Hoses which pass the mixture formed onto the field may be connected to the outlet pipes. In this case, the mixture is either laid directly onto the soil, or a suitable device ensures that it is injected into the soil. Such injecting devices are known from the prior art.

The invention involves a number of advantages, First, a work operation is saved because two processes are carried out simultaneously. This saves both time and fuel, which improves the farmer's finances and reduces the emission of greenhouse gases into the environment. Secondly, reduced soil cultivation through direct sowing causes a decrease in the loss of nitrogen through run-off and thus gives rise to better resource utilisation and less pollution. Tests also show a considerable reduction in erosion and a decrease in phosphorus pollution from areas which have been sown directly without soil cultivation. Thirdly, the investment costs in agricultural machines are reduced, as one machine carries out several work processes.

The use of wet sowing technique gives the advantages of a more certain plant establishment, as seeds are mixed with a growth medium which gives both the necessary moisture for the seed to germinate and plant nutrition for growth. In conditions in which liquid farmyard manure is not available, water or another liquid can be used.

The rotary distributor according to the invention may also be used for distributing dry particles such as seeds, artificial fertiliser and lime. By means of a gas stream, the particles are transported into the second supply pipe, out into the second rotor arm, out through the opening in the rotor arm and are distributed across the outlet apertures in that the rotor shaft is rotated mechanically. From the outlet pipes, the particles are carried by the gas stream onwards and downwards onto the ground or into the soil.

The rotary distributor according to the invention may also be used for distributing two different liquids; for example, when adding a liquid supplement to the liquid farmyard manure. Thus, a second liquid stream is added to the second supply pipe and the liquid flows through the hollow shaft and out through the second rotor and out through the opening and into the outlet apertures.

The rotary distributor according to the invention may also be used solely for distributing a liquid under pressure, that is to say without material being fed to the second supply pipe. Thus, it is not necessary for the user to invest in a separate distributor for the spreading of liquid.

Within the scope of the present invention, the particles can be carried forward to and fed into the second supply pipe in any manner, for example, by means of an air stream, a mechanical conveyor or by using the force of gravity.

The outlet pipes from the distributor housing are optionally connected via hoses to one or more devices which lead the mixture to where the user wishes to sow/water/fertilise.

In use, the distributor may be a part of an agricultural machine. For example, the distributor can be connected to a spreader boom that is moved across a field by a tractor.

BRIEF DESCRIPTION OF THE DRAWINGS

The invention will now be described in more detail below with reference to the drawings which schematically show some possible embodiments of the invention.

DETAILED DESCRIPTION OF THE INVENTION

Figure 1:
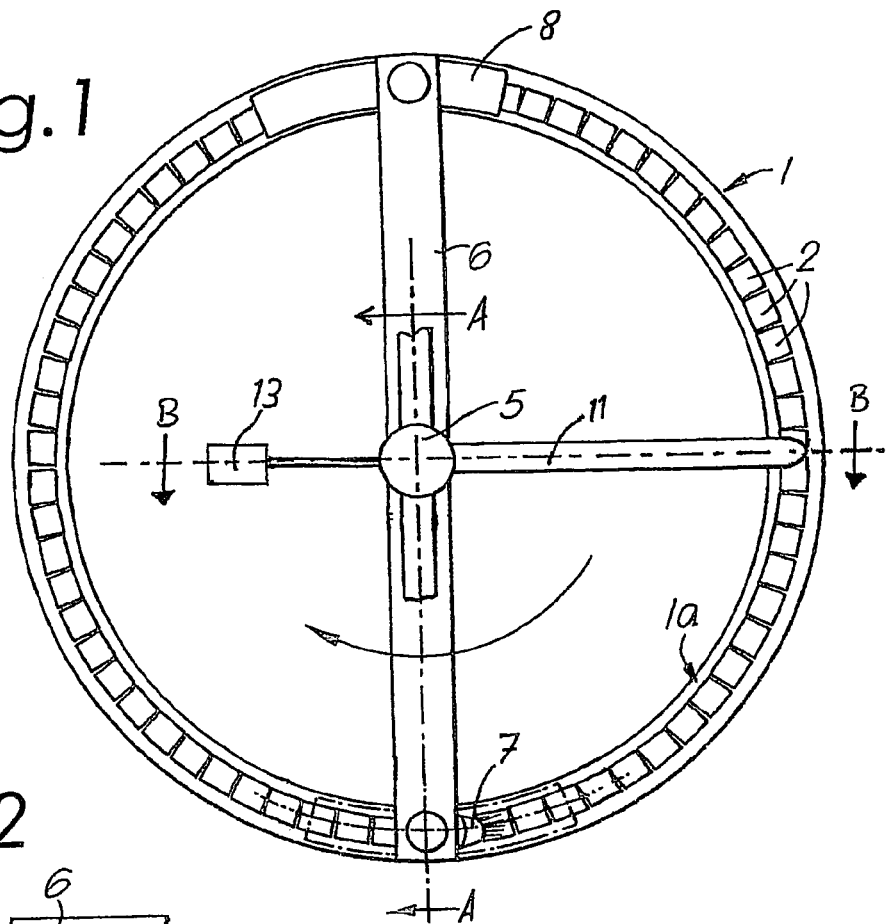
FIG. 1 is a top view of a distributor.

FIG. 1 shows a round distributor housing 1 having outlet apertures 2, a central rotor shaft 5, a first rotor arm 6 with nozzle 7 and a second rotor arm 11. The distributor housing is seen from above. In use, a cover will preferably be arranged on the distributor housing, as can be seen from FIGS. 4 and 5.

Figure 5:
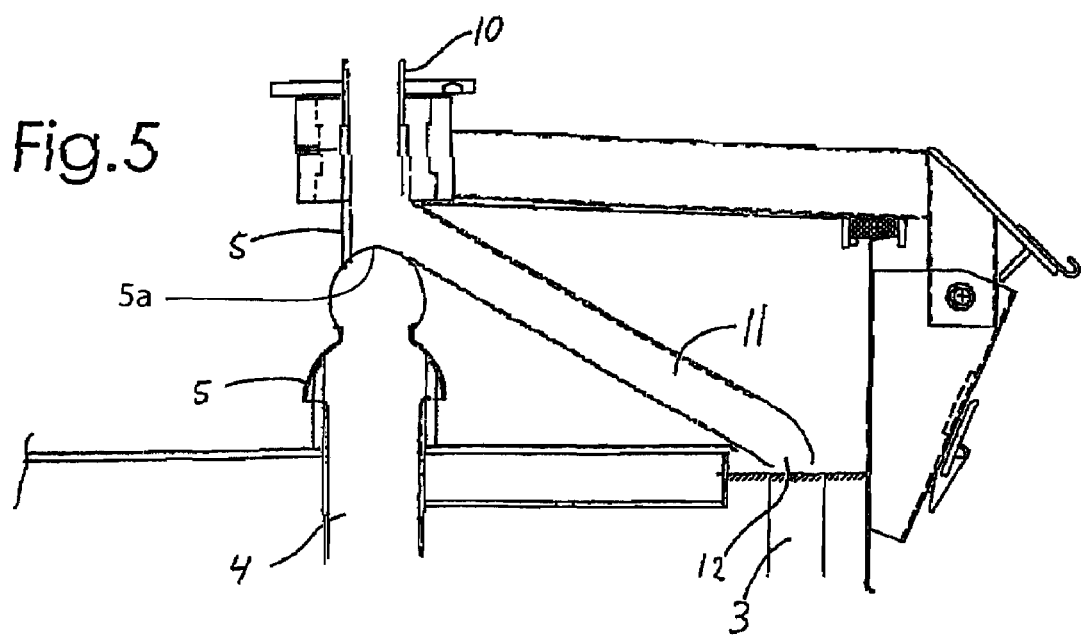
FIG. 5 is a cross-sectional view taken along the line B-B.

As can be seen in FIGS. 1 and 5, a preferred embodiment of the invention comprises a first rotor arm 6 and a second rotor arm 11. The second rotor arm 11 has at least one opening 12 for distributing solid particles in the outlet holes 2. The second rotor arm 11 preferably consists of a pipe that is angled relative to the rotor axis and which is bent at the opening 12 so as to lead the particles into the holes 2.

Figure 6:
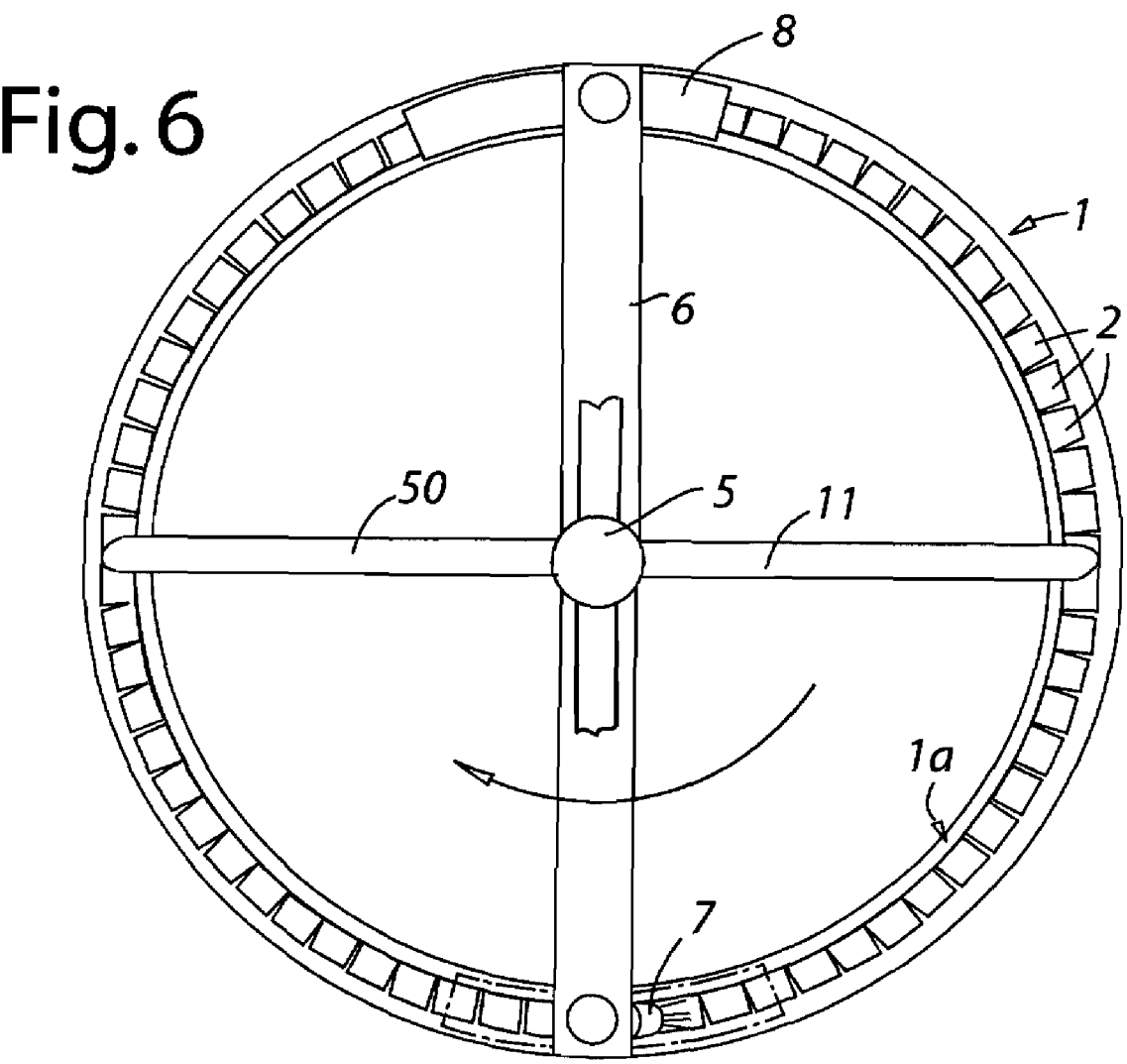
FIG. 6 is a top view of a distributor.

A counterweight 13 may be arranged on the diagonally opposite side ohhe rotor axis relative to the second rotor arm 11, as shown in FIG. 1. As shown in FIG. 6, this counterweight may be in the form of an additional hollow rotor arm 50 in flow communication with the second supply pipe 10 and having an opening which is level with the outlet holes 2.

Figure 2:
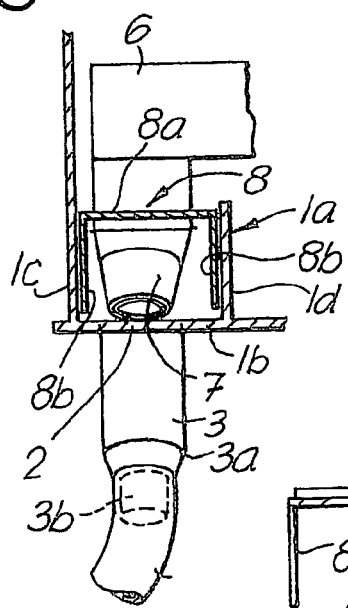
FIG. 2 is a detailed view of the nozzle seen in the direction of rotation.
Figure 3:
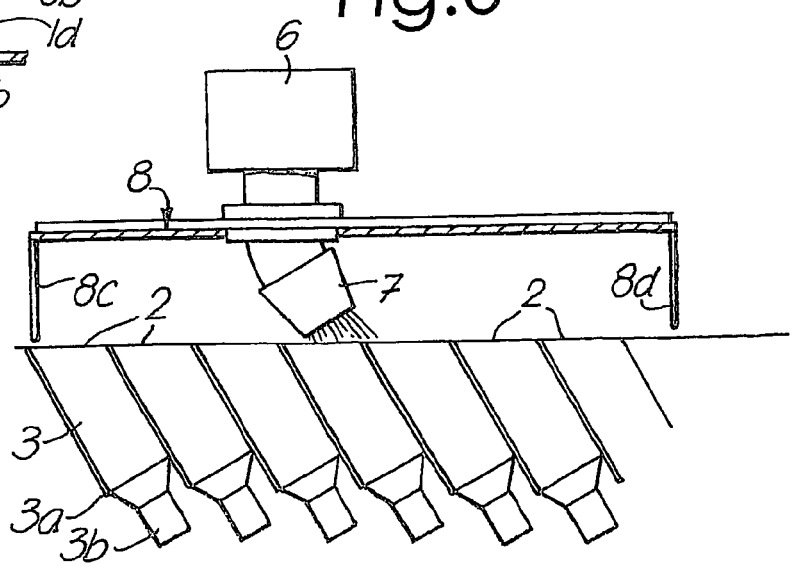
FIG. 3 is a detailed view of the nozzle looking towards the rotor axis.

FIGS. 2 and 3 show an embodiment of the invention wherein a U-shaped guard 8 is arranged around the nozzle 7. Furthermore, the distributor housing 1 is equipped with an annular channel 1a in the bottom 1b of which the outlet holes 2 are arranged. The annular channel 1a has side walls 1c, 1d. The nozzle 7 projects down into the annular channel 1a between the side walls 1c, 1d. The bottom 8a of the guard 8 faces upwards. The side walls 8b of the guard project down into the channel roughly parallel to the side walls 1c, 1d. The nozzle 7 is passed in through the guard 8. The guard 8 prevents or limits spray from the nozzle. As shown in FIG. 3, the guard 8 may be equipped with end walls 8c, 8d and extend across several outlet holes 2.

Figure 4:
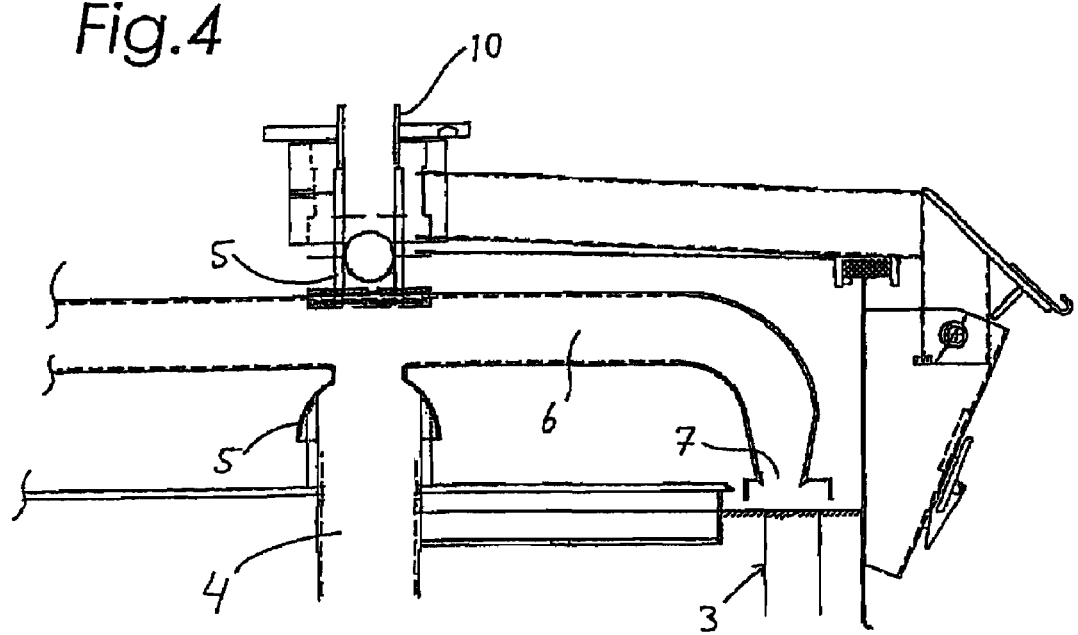
FIG. 4 is a cross-sectional view taken along the line A-A.

FIGS. 4 and 5 are cross-sectional views of the distributor seen from side from two different directions. From FIG. 4 it can be seen how the hollow rotor shaft 5 is in flow communication with the first rotor arm 6, so that liquid can flow in through the first supply pipe 4, through the hollow rotor shaft 5, out into the first rotor arm 6 and out through the nozzle 7. FIG. 5 shows how the hollow rotor shaft 5 is in flow communication with the second rotor arm 11, which means that solid particles can be passed in through the second supply pipe 10, through the hollow rotor 5, and out into the second rotor arm 11 and then out through the opening 12. Arranged in the hollow rotor shaft 5, between the two rotor arms 6, 11, is a dividing wall 5a which ensures two separate streams until the liquid and the solid particles are mixed in the outlet pipes 3.

The invention claimed is:
1. A rotary distributor, comprising:
a substantially round distributor housing having a top and bottom;
a plurality of outlets formed near the periphery of the bottom of the distributor housing, the outlets being connected to outlet pipes;
a vertical, rotatable, hollow rotor shaft centrally located in the distributor housing;
a first supply pipe connected to the rotor shaft near the bottom of the distributor housing, the first supply pipe receiving a supply of pressurized liquid;
a first transverse, hollow rotor arm in fluid communication with the first supply pipe and comprising at least one downwardly directed nozzle for discharging fluid to the outlets;
a second supply pipe connected to the rotor shaft near the top of the distributor housing, the second supply pipe receiving at least one of a supply of solid particles and a supply of fluid; and
a second transverse hollow rotor arm in fluid communication with the second supply pipe and comprising at least one downwardly directed opening for discharging fluid to the outlets;
wherein the rotor shaft comprises a dividing wall ensuring that the first and second rotor arms provide separate flow paths.

2. The rotary distributor of claim 1, comprising a counterweight connected to the rotor shaft on the opposite side of the rotor shaft relative to the second rotor arm.

3. The rotary distributor of claim 2, wherein the counterweight comprises a third rotor arm in fluid communication with the second supply pipe and the rotor shaft, the third rotor arm comprising a downwardly directed opening for discharging to the outlets.

4. The rotary distributor of claim 1, wherein the distributor housing comprises an open annular channel having a bottom and outer and inner side walls.

5. The rotary distributor of claim 4, wherein the outlets are equidistantly spaced apart along the bottom of the channel.

6. The rotary distributor of claim 5, wherein each nozzle is surrounded by and connected to a guard comprising a U-shaped cross-section having side walls that project into the channel on opposite sides of the nozzle.

7. In a rotary distributor, comprising a substantially round distributor housing having a top and bottom; a plurality of outlets formed near the periphery of the bottom of the distributor housing, the outlets being connected to outlet pipes; a vertical, rotatable, hollow rotor shaft centrally located in the distributor housing; a first supply pipe connected to the rotor shaft near the bottom of the distributor housing, the first supply pipe receiving a supply of pressurized liquid; a first transverse, hollow rotor arm in fluid communication with the first supply pipe and comprising at least one downwardly directed nozzle for discharging fluid to the outlets; a second supply pipe connected to the rotor shaft near the top of the distributor housing, the second supply pipe receiving at least one of a supply of solid particles and a supply of fluid; and a second transverse hollow rotor arm in fluid communication with the second supply pipe and comprising at least one downwardly directed opening for discharging fluid to the outlets; wherein the rotor shaft comprises a dividing wall ensuring that the first and second rotor arms provide separate flow paths;
   a method of wet sowing, comprising the steps of:
   supplying liquid under pressure to the first supply pipe;
   feeding seed corn to the second supply pipe; and
   passing the liquid and seed corn out though the outlet pipes;
   wherein liquid flowing out through the nozzle sets the rotor shaft in motion to distribute seed corn and liquid evenly across the outlets.

8. The method of claim 7, further comprising the step of feeding, with liquid under pressure, solid particles comprising seeds, solid fertilizers, lime and soil additives to the second supply pipe.

9. The method of claim 7, further comprising the step of feeding, with a gas stream, solid particles comprising seeds, solid fertilizers, lime and soil additives to the seconds supply pipe.

10. A rotary distributor, comprising:
   a distributor housing having a top and bottom;
   a plurality of outlets formed near the periphery of the bottom of the distributor housing;
   a rotatable and substantially hollow rotor shaft located in the distributor housing;
   a first supply pipe connected to the rotor shaft, the first supply pipe receiving a supply of pressurized liquid;
   a first substantially hollow rotor arm in fluid communication with the first supply pipe and comprising at least one nozzle that discharges fluid to the outlets;
   a second supply pipe connected to the rotor shaft, the second supply pipe receiving at least one of solid particles and fluid; and
   a second substantially hollow rotor arm in fluid communication with the second supply pipe and comprising at least one opening that discharges fluid to the outlets;
   wherein the rotor shaft comprises a dividing wall separating the first and second rotor arms.

11. The rotary distributor of claim 10, comprising a counterweight connected to the rotor shaft on the opposite side of the rotor shaft relative to the second rotor arm.

12. The rotary distributor of claim 11, wherein the counterweight comprises a third rotor arm in flow communication with the second supply pipe and the rotor shaft, the third rotor arm comprising an opening that discharges to the outlets.

13. The rotary distributor of claim 10, wherein the distributor housing comprises an annular channel having a bottom and outer and inner side walls.

14. The rotary distributor of claim 13, wherein the outlets are equidistantly spaced apart along the bottom of the channel.

15. The rotary distributor of claim 14, wherein each nozzle is surrounded by and connected to a guard comprising a U-shaped cross-section having side walls that project into the channel on opposite sides of the nozzle.

* * * * *